United States Patent Office 3,348,953
Patented Oct. 24, 1967

3,348,953
DESSERT PRODUCT
Edward M. Brooks, Arleta, Calif., assignor to Carnation Company, Los Angeles, Calif., a corporation of Delaware
No Drawing. Filed Aug. 4, 1965, Ser. No. 477,310
5 Claims. (Cl. 99—139)

ABSTRACT OF THE DISCLOSURE

The present invention is particularly directed to a frozen, baked custard which includes water, eggs, milk and a saccharide and preferably also includes gelatin. The saccharide is present in a critical concentration of more than 17% to prevent syneresis after baking and freezing and upon thawing. Preferably a major portion of the saccharide consists of dextrose or corn syrup solids, that is a mono-saccharide, instead of a polysaccharide.

---

This invention relates to a new baked, frozen custard for pies, cakes, puddings and other fillings.

The literature has reported many unsuccessful attempts to prepare baked, frozen custard. For example, S. A. Matz, on page 199 of "Food Texture," reports several unsuccessful attempts to prepare a baked custard which could be frozen. Similar difficulty was encountered by Tressler and Evers in their experiments reported in the "Freezing Preparation of Foods," pages 14 and 16. All prior baked custards, including those referred in the the literature mentioned above, are subject to the problems of deterioration and instability when frozen and thawed.

An object of this invention is a new, stable baked custard which may be frozen and thawed without inducing syneresis or grainy texture. A further object is a baked, frozen custard of improved flavor and texture.

Broadly, the invention comprises the addition of prescribed minimum quantities of a saccharide, preferably a mono-saccharide such as dextrose. Preferably, the saccharide is used in combination with gelatin.

A typical baked custard is made from eggs or egg yolks, milk and sugar. In the products of the present invention, the milk may comprise non-fat dry milk, skim milk or whole milk and is best used so as to give between about 3.0% to 18% milk solids in the final composition. Fresh, frozen or powdered egg yolks are preferably used to an extent of from about 2.0% to about 20% egg solids in the final composition. Flavoring, such as salt, vanilla, chocolate, etc., are added to taste. Generally, the salt content will be below about .1%, and the flavoring content will vary greatly depending on the flavoring used. From 30.0% to 65.0% is water.

The objects of the invention are achieved by combining with the foregoing ingredients a minimum quantity of sugar. Suitably, more than 17% by weight of the total composition is sugar. A more desirable sugar level is from about 20% to 50% sugar, and for preferred results from about 23% to 40% sugar is used. For best results, and to avoid excessive sweetness, a large portion of the sugar added is preferably a sugar of low sweetening power such as dextrose, and specifically corn syrup solids are preferred. Sucrose or other saccharides of high sweetening power may be used in combination with corn syrup solids and the quantity of such saccharides will preferably range from about 2% to 14% depending upon the flavor of the custard and the desired sweetness.

For best results, from about .2% to 3.0% gelatin is preferably added to the foregoing ingredients.

To specifically illustrate the invention, several non-limiting examples of the preferred formulations are set forth below:

| Ingredients | Weight Percent | | | |
|---|---|---|---|---|
| | Example I Vanilla Custard | Example II Chocolate Custard | Example III Coconut Custard | Example IV Rice-Raisin Custard |
| Water | 51.9 | 51.0 | 50.0 | 42.5 |
| Non-fat dry milk | 8.0 | 8.2 | 8.0 | 6.8 |
| Corn syrup solids | 19.0 | 19.0 | 18.6 | 15.9 |
| Sucrose | 4.5 | 4.4 | 4.3 | 4.7 |
| Egg | 15.0 | 15.0 | 14.6 | 12.5 |
| Gelatin | 0.7 | 0.68 | 0.7 | 0.6 |
| Vanilla | 0.02 | 0.02 | 0.02 | 0.01 |
| Nutmeg | 0.01 | | | 0.01 |
| Salt | 0.08 | 0.08 | 0.1 | 0.06 |
| Cocoa | | 1.7 | | |
| Shredded coconut | | | 3.9 | |
| Rice | | | | 14.5 |
| Raisins | | | | 2.4 |

The foregoing ingredients were prepared as follows: Eggs and water were blended at low speeds until homogenized. The dry ingredients, such as corn syrup solids, milk and sugar, are added slowly during blending. The gelatin and any flavoring ingredients are added and the custard is strained into a receptacle for baking at 325° F. to 375° F., and preferably 350° F. from 25 to 35 minutes in a water bath or without a water bath at a temperature of about 230° F. to 270° F. for 10 to 15 minutes.

On completion of baking, the custard is removed from the oven and placed in a sharp room. Preferably, the sharp room is at a temperature of below −20° F. After freezing, the custard is preferably stored at a temperature of about 0° F.

To illustrate the effectiveness of the invention, baked, frozen custards prepared according to the invention were tested against a control sample. The control was prepared according to the procedure set forth above and contained the following ingredients:

Ingredients: Weight percent
Water _____ 61.02
Non-fat dry milk _____ 8.31
Sucrose _____ 14.47
Frozen whole egg _____ 15.18
Gelatin _____ 0.69
Vanillin _____ 0.02
Salt _____ 0.30
Nutmeg _____ 0.01

After the custard was frozen and thawed once, the custard collapsed and it exhibited excessive syneresis. The texture was unacceptable and graininess appeared.

| Ingredients | Weight Percent | | | | |
|---|---|---|---|---|---|
| | A | B | C | D | E |
| Water | 39.3 | 46.0 | 39.4 | 51.7 | 47.6 |
| Non-fat dry milk | 8.3 | 8.3 | 8.3 | 8.3 | 8.4 |
| Corn syrup | 36.2 | 25.1 | 36.3 | | |
| Corn syrup solids | | | | 19.3 | 27.9 |
| Sucrose | | 4.4 | | 4.4 | |
| Frozen whole egg | 15.2 | 15.2 | 15.2 | 15.2 | 15.2 |
| Gelatin | 0.7 | 0.7 | 0.7 | 0.7 | 0.7 |
| Butter salt | 0.3 | 0.3 | | 0.3 | 0.2 |
| Vanilla | 0.02 | 0.02 | 0.02 | 0.02 | 0.02 |
| Nutmeg | 0.01 | 0.01 | 0.01 | 0.01 | 0.01 |

Samples of the products set forth in the above samples were subjected to freezing under identical conditions with the control. The custards were evaluated based on the amount of syneresis developed after freezing. The control and all samples were subjected to constant temperature storage at 0° F., and to accelerated storage. Under accelerated storage the custards were maintained for 15 hours at 0° F. and then for 9 hours at 38° F. One sample of each custard formula was evaluated each week for 6 weeks.

As noted above, the custards prepared according to the invention exhibited no syneresis on thawing after 6 months constant temperature storage, whereas, the control exhibited excessive syneresis. Under accelerated storage conditions, the control collapsed and exhibited excessive syneresis after the first thawing. The samples prepared according to the invention did not collapse or exhibit excessive syneresis for 1 to 5 weeks under accelerated storage. Under commercial storage conditions, this would give the custards a shelf life of 6 months to a year. These results are shown by the following table.

| Sample No. | 6 mos. Constant Temperature | Accelerated Storage, weeks | | | | | |
|---|---|---|---|---|---|---|---|
| | | 1 | 2 | 3 | 4 | 5 | 6 |
| Control | X | | | | | | |
| Sample A | Acceptable at end | | | | X | | |
| Sample B | do | X | | | | | |
| Sample C | do | X | | | | | |
| Sample D | do | | | | X | | |
| Sample E | do | | | | | X | |

X indicates the week in which deterioration was noted.

While the invention has been described with reference to specific embodiments, it will be appreciated that modifications of the specific embodiments will occur to those skilled in the art upon reading the foregoing specification. Accordingly, it is intended that those modifications which fall within the broad scope of the appended claims be included.

All percentages in the specification and claims are weight percentages unless otherwise stated.

Having described the invention, what is claimed is:

1. A frozen, baked custard comprising in combination a mixture of water, egg solids, milk solids, and more than 17% of saccharide and at least about 0.2% of gelatin.

2. A frozen, baked custard which is resistant to syneresis on freezing and thawing comprising in combination a mixture of:
   (a) Above about:
      (1) 30.0% water
      (2) 4.0% milk solids
      (3) 3.0% egg solids
      (4) 0.2% gelatin
      (5) 20.0% of saccharide.

3. The composition of claim 2 wherein a major proportion of the saccharide comprises corn syrup solids and a minor proportion of the saccharide comprises sucrose.

4. A frozen, baked custard resistant to syneresis on freezing and thawing comprising in combination a mixture of: 30.0% to 65.0% water; 4.0% to 15.0% milk solids; 2.0% to 12.0% egg solids; 0.2% to 3.0% gelatin; a minor amount of salt and flavoring; and 20.0% to 40.0% saccharide.

5. The composition of claim 4 wherein 15% to 35% of the mixture is corn syrup solids and is in major proportion with respect to the remainder of the saccharide in the composition.

References Cited

UNITED STATES PATENTS 2,970,918   2/1961   Petersen _____ 99—139

A. LOUIS MONACELL, *Primary Examiner.*

J. M. HUNTER, *Assistant Examiner.*